(12) United States Patent
Akram

(10) Patent No.: US 8,260,595 B2
(45) Date of Patent: Sep. 4, 2012

(54) INTELLIGENT COMPLETION DESIGN FOR A RESERVOIR

(75) Inventor: Farrukh Akram, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 468 days.

(21) Appl. No.: 12/542,817

(22) Filed: Aug. 18, 2009

(65) Prior Publication Data

US 2010/0051280 A1    Mar. 4, 2010

Related U.S. Application Data

(60) Provisional application No. 61/093,693, filed on Sep. 2, 2008.

(51) Int. Cl.
*G06G 7/48* (2006.01)
(52) U.S. Cl. ......................................................... 703/10
(58) Field of Classification Search .................... 703/10, 703/6; 166/250.15, 268, 254.2; 73/152.05; 175/50; 702/6
See application file for complete search history.

(56) References Cited

U.S. PATENT DOCUMENTS

| | | | |
|---|---|---|---|
| 6,321,840 B1 * | 11/2001 | Billiter et al. ................. | 166/268 |
| 7,835,893 B2 * | 11/2010 | Cullick et al. .................... | 703/6 |
| 2004/0060351 A1 * | 4/2004 | Gunter et al. .............. | 73/152.05 |
| 2004/0065439 A1 * | 4/2004 | Tubel et al. ............... | 166/250.15 |
| 2005/0167103 A1 * | 8/2005 | Horner et al. .................. | 166/268 |
| 2007/0156377 A1 * | 7/2007 | Gurpinar et al. ................ | 703/10 |
| 2008/0087423 A1 * | 4/2008 | Wylie et al. ................. | 166/254.2 |
| 2008/0133194 A1 * | 6/2008 | Klumpen et al. ............... | 703/10 |
| 2008/0288226 A1 * | 11/2008 | Gurpinar et al. ................ | 703/10 |
| 2009/0012765 A1 * | 1/2009 | Raphael .......................... | 703/10 |
| 2009/0192712 A9 * | 7/2009 | Karami ............................. | 702/6 |
| 2009/0216508 A1 * | 8/2009 | Dale et al. ........................ | 703/10 |
| 2009/0288881 A1 * | 11/2009 | Mullins et al. ................... | 175/50 |

OTHER PUBLICATIONS

Akram, Farrukh, "Effects of Well Placements and Intelligent Completions on SAGD in a Full-Field Thermal-Numerical Model for Athabasca Oil Sands", Publication: SPE-ITOHOS 2008, Oct. 21, 2008 (8 pages).

* cited by examiner

*Primary Examiner* — Kandasamy Thangavelu

(57) ABSTRACT

The invention relates to a method of performing intelligent completion design for a reservoir within a field having at least one wellsite with a steam injection well penetrating a subterranean formation of the field for extracting fluid from the reservoir therein. The method involves obtaining measurement data of the subterranean formation associated with the steam injection well, generating, using a processor of a computer, a reservoir model based on the measurement data, determining, using the processor, a geological profile adjacent to the steam injection well using the reservoir model, identifying, using the processor, a location along the steam injection well based on the geological profile according to a pre-determined criteria, and defining and storing, using the processor, a steam injection configuration based on the location.

20 Claims, 7 Drawing Sheets

INTELLIGENT COMPLETION DESIGN FOR A RESERVOIR

CROSS-REFERENCE TO RELATED APPLICATIONS

This application claims priority pursuant to 35 U.S.C. §119 (e) to U.S. Provisional Patent Application No. 61/093,693 entitled "System and Method For Completion Design For Porous Reservoir," filed Sep. 2, 2008, in the name of Farrukh Akram, the disclosure of which is incorporated by reference herein in its entirety.

BACKGROUND

Oil sand is a sand layer or sand body having pore spaces filled with oil, often considered to be a mixture of sand, clay, water, and bitumen (i.e., hydrocarbon fluid with a gravity of 10° API or lower, such as asphalt, mineral wax, etc.). Both in-situ recovery (i.e., extraction through wells) and mining methods are used to extract oil sands. A common recovery method for oil sands is Steam-Assisted Gravity Drainage ("SAGD") operation, which is a thermal production method that pairs a high-angle injection well (or injector) with a nearby production well (or producer) drilled along a parallel trajectory. A pair of high-angle wells, having parallel horizontal sections through the reservoir, is typically drilled with a vertical separation of about 5 meters in the parallel horizontal sections. Steam is then injected into the reservoir through the upper well. As the steam rises and expands, it heats up the bitumen or heavy oil, reducing its viscosity. Gravity forces the oil to drain into the lower well, where the oil is produced.

It is common practice in SAGD operations to perforate the entire horizontal section of the wellbore (for both the injector and producer) to let steam penetrate the reservoir. This results in a loss of steam to zones that do not contribute to production and a loss of heat to non-bitumen bearing rocks. In this case, non-productive operational expenses are incurred due to the cost of steam and ineffective operations resulting from incomplete utilization of the steam.

SUMMARY

In general, in one or more aspects, the invention relates to a method of performing intelligent completion design for a reservoir within a field having at least one wellsite with a steam injection well penetrating a subterranean formation of the field for extracting fluid from the reservoir therein. The method involves obtaining measurement data of the subterranean formation associated with the steam injection well, generating, using a processor of a computer, a reservoir model based on the measurement data, determining, using the processor, a geological profile adjacent to the steam injection well using the reservoir model, identifying, using the processor, a location along the steam injection well based on the geological profile according to a pre-determined criteria, and defining and storing, using the processor, a steam injection configuration based on the location.

Other aspects and advantages of the invention will be apparent from the following description and the appended claims.

BRIEF DESCRIPTION OF THE DRAWINGS

The appended drawings illustrate several embodiments of intelligent completion design for a reservoir and are not to be considered limiting of its scope, for intelligent completion design for a reservoir may admit to other equally effective embodiments.

FIGS. 4-1 through 4-3 illustrate example operation configurations of intelligent completion design for a reservoir in accordance with one or more embodiments.

DETAILED DESCRIPTION

Figure 1:
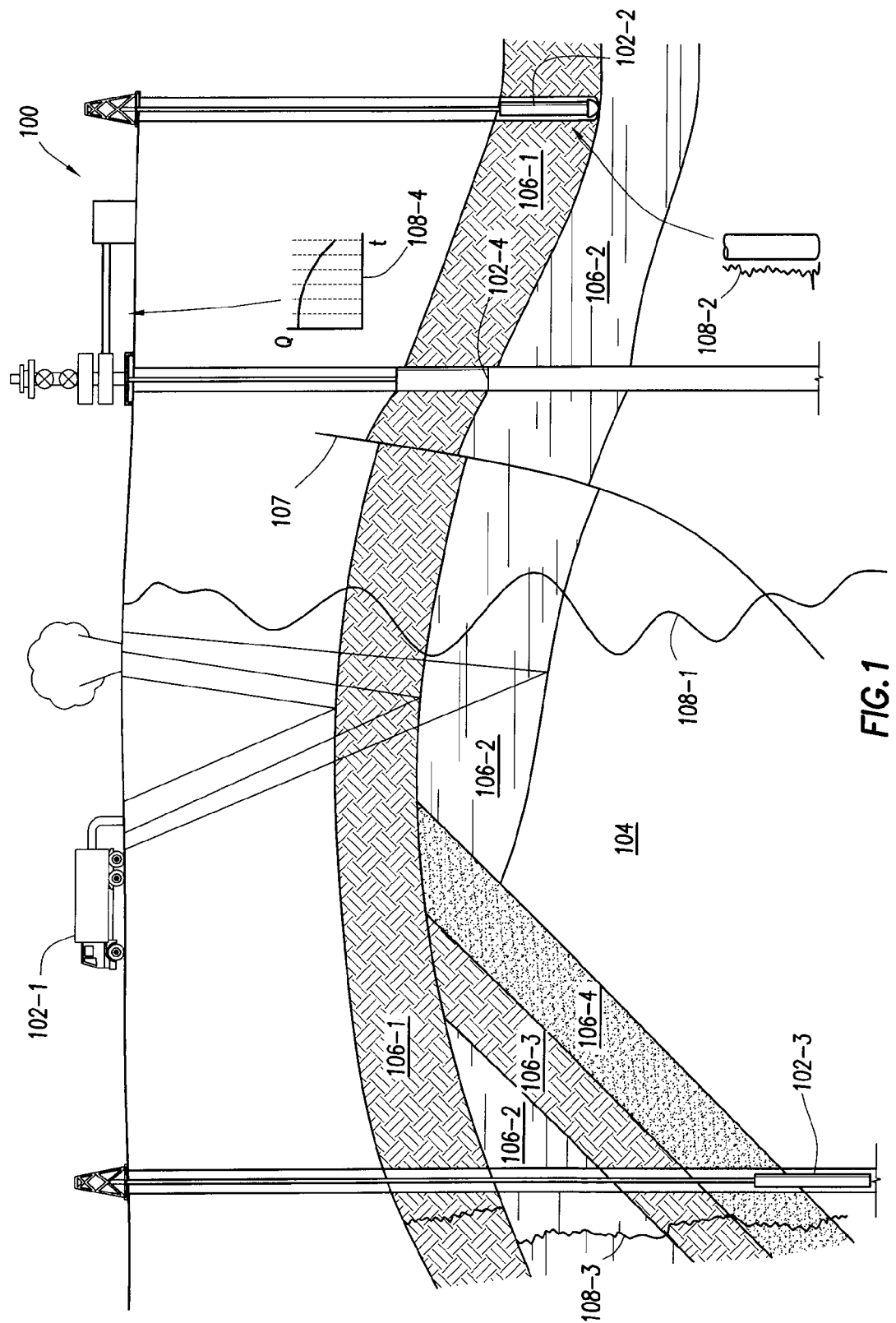
FIG. 1 illustrates a schematic view, partially in cross-section, of a field having a plurality of data acquisition tools positioned at various locations along the field for collecting data from the subterranean formation, in which embodiments of intelligent completion design for a reservoir may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

FIG. 1 is a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, data plots (108-1 through 108-4) are examples of plots of static properties that may be generated by the data acquisition tools (102-1 through 102-4), respectively. Data plot (108-1) is a seismic two-way response time. Data plot (108-2) is core sample data measured from a core sample of the formation (104). Data plot (108-3) is a logging trace. Data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

As shown in FIG. 1, the subterranean formation (104) has several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
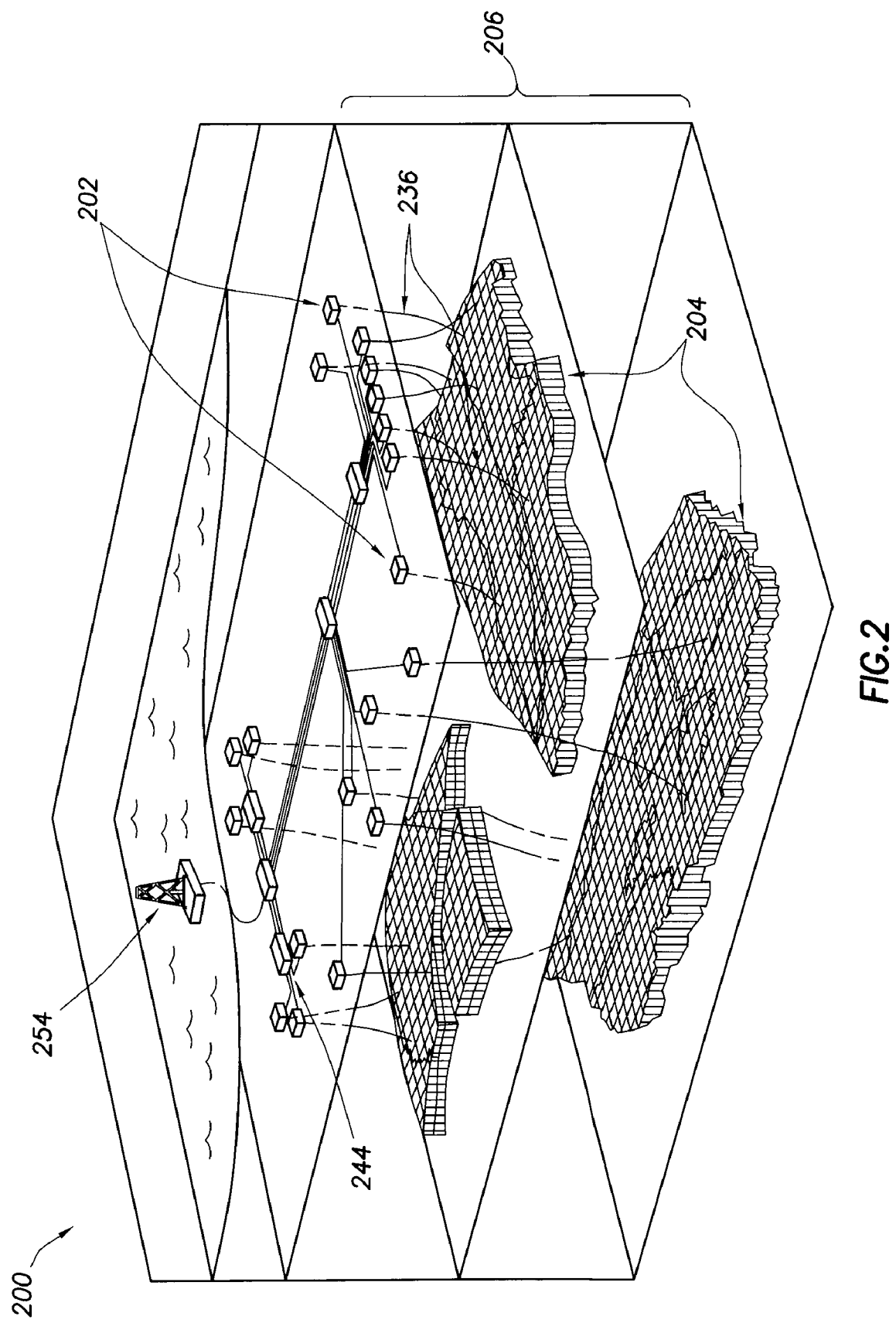
FIG. 2 illustrates a schematic view of a field having a plurality of wellsites in which one or more embodiments of intelligent completion design for a reservoir may be implemented.

FIG. 2 shows a field (200) in accordance with one or more embodiments. As shown, the field has a plurality of wellsites (202) operatively connected to a central processing facility (254). The field configuration of FIG. 2 is not intended to limit the scope of intelligent completion design for a reservoir. Part or all of the field may be on land and/or water locations (e.g., sea). Also, while a single field with a single processing facility and a plurality of wellsites is depicted, any combination of any number of fields, any number of processing facilities, and any number of wellsites may be present.

In one or more embodiments, each wellsite (202) includes equipment that forms one or more wellbores (236) into the earth. The wellbores extend through subterranean formations (206) including reservoirs (204). These reservoirs (204) may contain fluids, such as hydrocarbons, and other geomaterials. The wellsites draw fluid and other geomaterials from the reservoirs and pass them to the processing facilities via gathering networks (244). The gathering networks (244) have tubing and control mechanisms for controlling the flow of fluids and other geomaterials from the wellsite to the processing facility (254).

Figure 3:
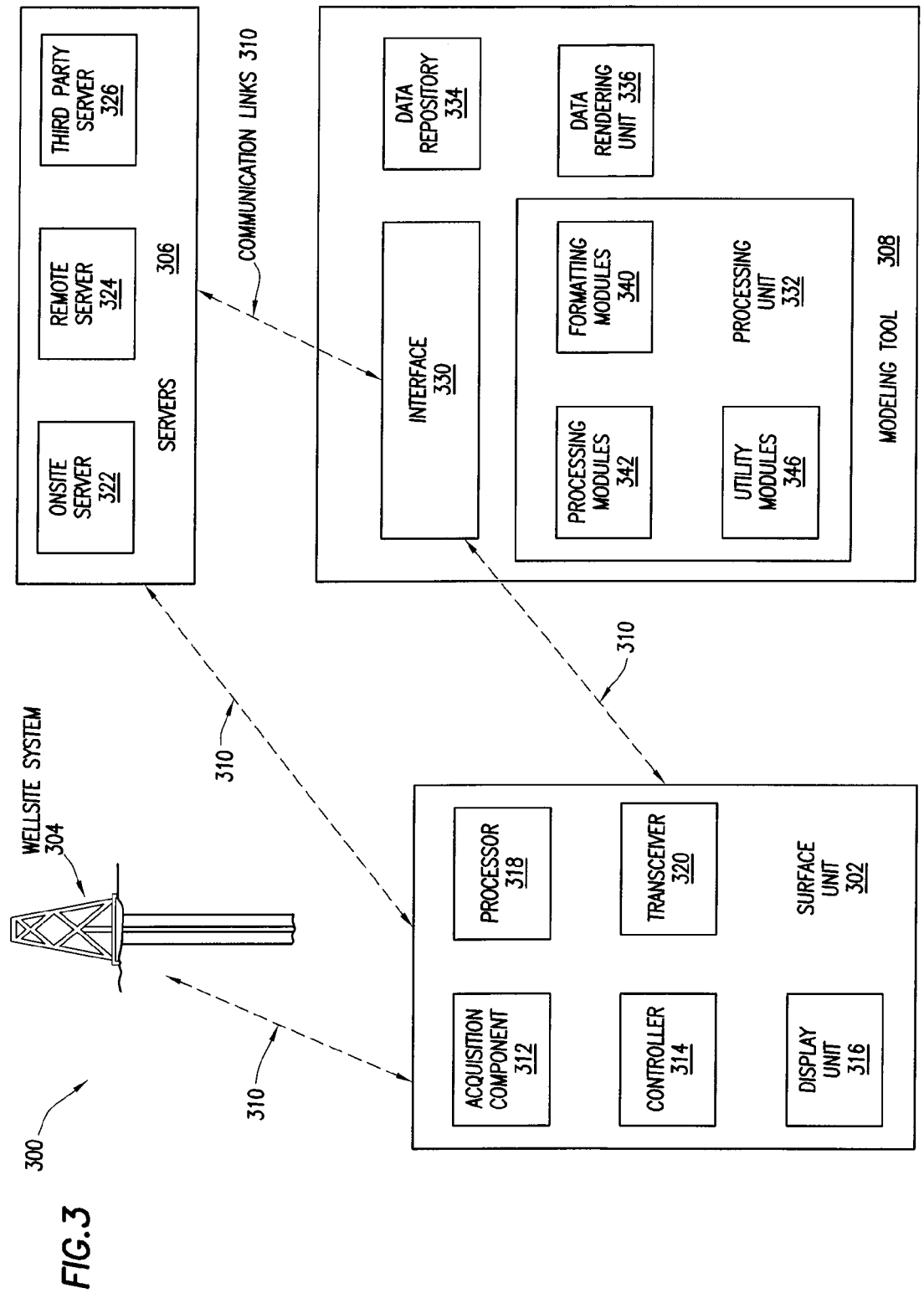
FIG. 3 illustrates a system in which one or more embodiments of intelligent completion design for a reservoir may be implemented.

FIG. 3 shows a system (300) incorporated with a portion of a field, as shown and described above with respect to FIG. 2. As shown, the system (300) includes a surface unit (302) operatively connected to a wellsite system (304), servers (306), and a modeling tool (308) via an interface (330) on the modeling tool (308). The modeling tool (308) is also operatively linked, via the interface (330), to the servers (306). The surface unit (302) and wellsite system (304) may include various field tools and wellsite facilities. As shown, communication links (310) are provided between the surface unit (302) and the wellsite system (304), servers (306), and modeling tool (308). A communication link (310) is also provided between the modeling tool (308) and the servers (306). A variety of links may be provided to facilitate the flow of data through the system (300). For example, the communication links (310) may provide for continuous, intermittent, one-way, two-way and/or selective communication throughout the system (300). The communication links (310) may be of any type, including but not limited to wired and wireless.

In one or more embodiments, the surface unit (302) is provided with an acquisition component (312), a controller (314), a display unit (316), a processor (318), and a transceiver (320). The acquisition component (312) collects and/ or stores data of the field. This data may be measured by sensors at the wellsite. This data may also be received from other sources, such as those described with respect to FIG. 1 above.

The controller (314) may be enabled to enact commands at the field. The controller (314) may be provided with actuation means that can perform drilling operations, such as steering, advancing, or otherwise taking action at the wellsite. Commands may be generated based on logic of the processor (318), or by commands received from other sources. In one or more embodiments, the processor (318) is provided with features for manipulating and analyzing the data. The processor (318) may be provided with additional functionality to perform field operations.

In one or more embodiments, a display unit (316) may be provided at the wellsite and/or remote locations for viewing field data (not shown). The field data represented by the display unit (316) may be raw data, processed data and/or data outputs generated from various data. In one or more embodiments, the display unit (316) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (316). The display unit (316) may include a two-dimensional (2D) display or a three-dimensional (3D) display for viewing field data or various aspects of the field operations.

In one or more embodiments, the transceiver (320) provides a means for providing data access to and/or from other sources. The transceiver (320) may also provide a means for communicating with other components, such as the servers (306), the wellsite system (304), the surface unit (302), and/or the modeling tool (308).

The servers (306) may be configured to transfer data from a surface unit (302) at one or more wellsites to the modeling tool (308). As shown, the servers (306) include an onsite server (322), a remote server (324), and a third party server (326). The onsite server (322) may be positioned at the wellsite and/or other locations for distributing data from the surface unit (302). As shown, the remote server (324) is positioned at a location away from the field and provides data from remote sources. The third party server (326) may be onsite or remote, but is often operated by a third party, such as a client.

In one or more embodiments, the servers (306) are capable of transferring data, such as logs, drilling events, trajectory, seismic data, historical data, economics data, other field data, and/or other data that may be of use during analysis. The type of server is not intended to limit intelligent completion design for a reservoir. In one or more embodiments, the system is adapted to function with any type of server that may be employed.

In one or more embodiments, the servers (306) communicate with the modeling tool (308) through the communication links (310). As indicated by the multiple arrows, the servers (306) may have separate communication links (310) with the modeling tool (308) and the surface unit (302). One or more of the servers (306) may be combined or linked to provide a combined communication link (310).

In one or more embodiments, the servers (306) collect a wide variety of data. The data may be collected from a variety of channels that provide a certain type of data, such as well logs. The data from the servers is passed to the modeling tool (308) for processing. The servers (306) may also be configured to store and/or transfer data.

In one or more embodiments, the modeling tool (308) is operatively linked to the surface unit (302) for receiving data therefrom. In some cases, the modeling tool (308) and/or server(s) (306) may be positioned at the wellsite. The modeling tool (308) and/or server(s) (306) may also be positioned at various locations. The modeling tool (308) may be operatively linked to the surface unit (302) via the server(s) (306). The modeling tool (308) may also be included in or located near the surface unit (302).

In one or more embodiments, the modeling tool (308) includes an interface (330), a processing unit (332), a data repository (334), and a data rendering unit (336). In one or more embodiments, the modeling tool (308) is configured to generate one or more models using field data. For example, the modeling tool (308) may be configured to generate a reservoir model of a reservoir associated with the wellsite system (304) based on measurement data collected by the surface unit (302). The model generated by the modeling tool (308) may be a full field numerical model, a geostatistical model, or some other suitable model. In one or more embodiments, the modeling tool (308) is configured to determine a geological profile using the generated model(s). The geological profile determined by the modeling tool (308) may provide information associated with the reservoir adjacent to the steam injection well. Specifically, the geological profile may provide information to aid in a number of operational decisions. Examples of information provided by the geological profile include, but are not limited to, identifying a location along the steam injection well for injecting steam, defining a steam injection configuration, and optimizing a SAGD operation based on a number of inputs defined by a user, by default, or by a suitable combination thereof.

In one or more embodiments, the interface (330) of the modeling tool (308) is configured to communicate with the servers (306) and the surface unit (302). The interface (330) may also be configured to communicate with other oilfield or non-oilfield sources. The interface (330) may be configured to receive the data and map the data for processing. In one or more embodiments, data from the servers (306) is sent along predefined channels, which may be selected by the interface (330).

As depicted in FIG. 3, the interface (330) selects the data channel of the server(s) (306) and receives the data. In one or more embodiments, the interface (330) also maps the data channels to data from the wellsite. The data may then be passed from the interface (330) to the processing modules (342) of the processing unit (332). In one or more embodiments, the data is immediately incorporated into the modeling tool (308) for real-time sessions or modeling. The interface (330) may create data requests (for example surveys, logs and/or other volume data sets), display the user interface, and monitor connection state events. In one or more embodiments, the interface (330) also instantiates the data into a data object for processing.

In one or more embodiments, the processing unit (332) includes formatting modules (340), processing modules (342), and utility modules (346). These modules are configured to manipulate the field data for analysis, potentially in real time.

In one or more embodiments, the formatting modules (340) transform the data to a desired format for processing. Incoming data may be formatted, translated, converted, or otherwise manipulated for use. In one or more embodiments, the formatting modules (340) are configured to enable the data from a variety of sources to be formatted and used so that the data processes and displays in real time.

In one or more embodiments, the utility modules (346) provide support functions to the modeling tool (308). In one or more embodiments, the utility modules (346) include a logging component (not shown) and a user interface (UI) manager component (not shown). The logging component provides a common call for the logging data, which means that the utility modules (346) allow the logging destination to be set by the application. The logging component may also be provided with other features, such as a debugger, a messenger, and a warning system, among others. The debugger sends a debug message to those using the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the UI manager component (not shown) creates user interface elements for displays. The UI manager component defines user input screens, such as menu items, context menus, toolbars, and settings windows. The UI manager may also be configured to direct events relating to these user input screens.

In one or more embodiments, the processing modules (342) are configured to analyze the data and generate outputs. As described above, the data analyzed by the processing modules (342) may include static data, dynamic data, historic data, real-time data, or other types of data. Further, the data analyzed by the processing modules (342) may relate to various aspects of the field operations, such as formation structure, geological stratigraphy, core sampling, well logging, density, resistivity, fluid composition, flow rate, downhole condition, surface condition, equipment condition, or other aspects of the field operations. In one or more embodiments, the data is processed by the processing module (342) into multiple volume data sets for storage and retrieval.

In one or more embodiments, the data repository (334) stores the data for the modeling tool (308). The data stored in the data repository (334) may be in a format available for use in real-time (e.g., information is updated at approximately the same rate that the information is received). In one or more embodiments, the data is passed to the data repository (334) from the processing modules (342). The data can be persisted in the file system (e.g., as an extensible markup language (XML) file) or in a database. The user, a computer program, or some other determining entity may determine which storage is the most appropriate to use for a given piece of data and stores the data in a manner to enable automatic flow of the data through the rest of the system in a seamless and integrated fashion. The system also facilitates manual and automated workflows (such as Modeling, Geological, and Geophysical workflows) based upon the persisted data.

In one or more embodiments, the data rendering unit (336) performs rendering algorithm calculations to provide one or more displays for visualizing the data. The displays for visualizing the data may be presented, using one or more communication links (310), to a user at the display unit (316) of the surface unit (302). The data rendering unit (336) may contain a 2D canvas, a 3D canvas, a well section canvas, or other canvases, either by default or as selected by a user. The data rendering unit (336) may selectively provide displays composed of any combination of one or more canvases. The canvases may or may not be synchronized with each other during display. In one or more embodiments, the data rendering unit (336) is provided with mechanisms for actuating various canvases or other functions in the system. Further, the data rendering unit (336) may selectively provide displays composed of any combination of one or more volume data sets. The volume data sets typically contain exploration and production data.

While specific components are depicted and/or described for use in the units and/or modules of the modeling tool (308), it will be appreciated that a variety of components with various functions may be configured to provide the formatting, processing, utility, and coordination functions necessary to process data in the modeling tool (308). The components may have combined functionalities and may be implemented as software, hardware, firmware, or suitable combinations thereof.

Further, components (e.g., the processing modules (342), the data rendering unit (336)) of the modeling tool (308) may be located in an onsite server (322) or in distributed locations where a remote server (324) and/or a third party server (326) may be involved. The onsite server (322) may be located within the surface unit (302).

In one or more embodiments, SAGD operations may be performed based on the field descriptions depicted in the above figures. A purpose of strategic implementation of steam injection operations is to minimize the loss of steam and maximize utilization of the heat transferred into the reservoir. In one or more embodiments, intelligent (or smart) completions may be configured to optimize the injected steam by placing it where there is greater potential for the steam to flow upwards in the reservoir. This placement allows the injected steam to target areas with the least resistance avoiding baffles (such as continuous zones of low permeability) and barriers (such as shale).

Figures 1, 4:
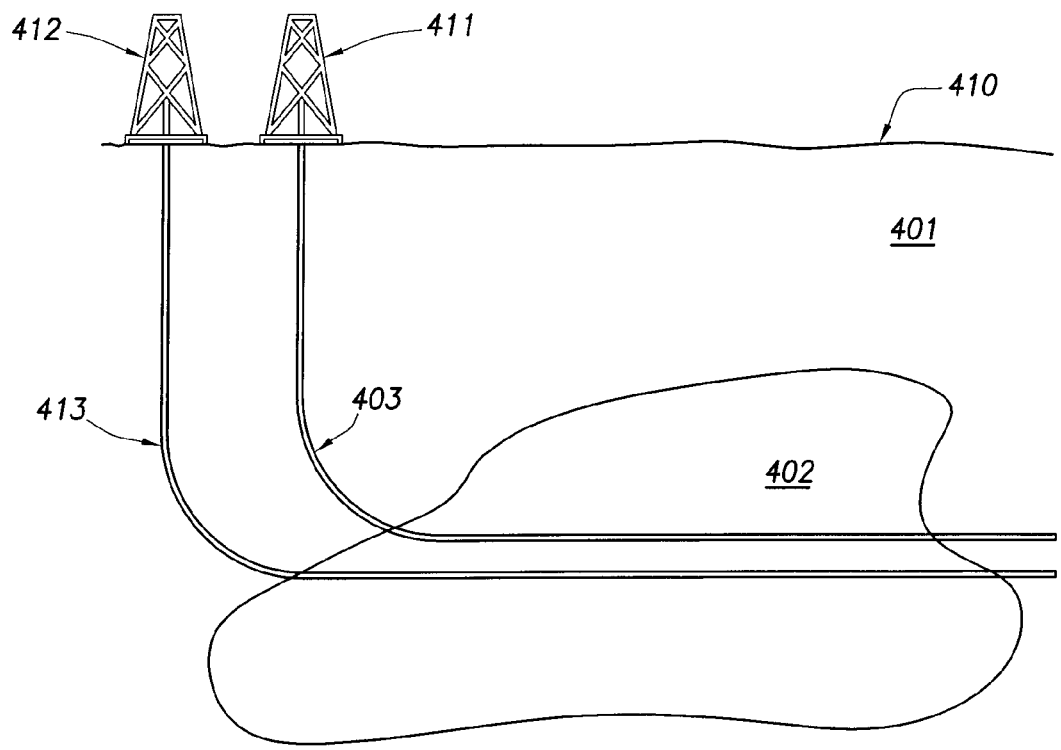
Figures 3, 4:
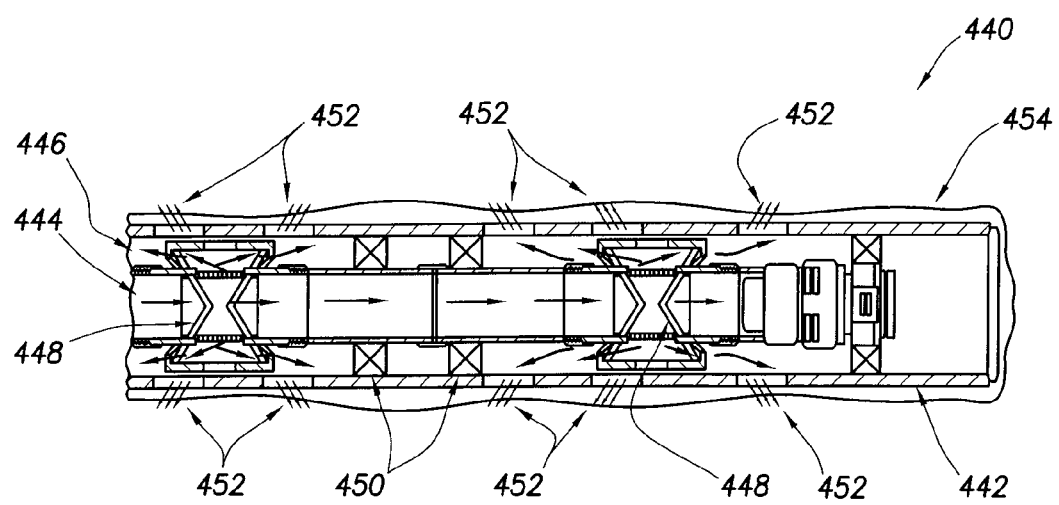
Figures 2, 4:
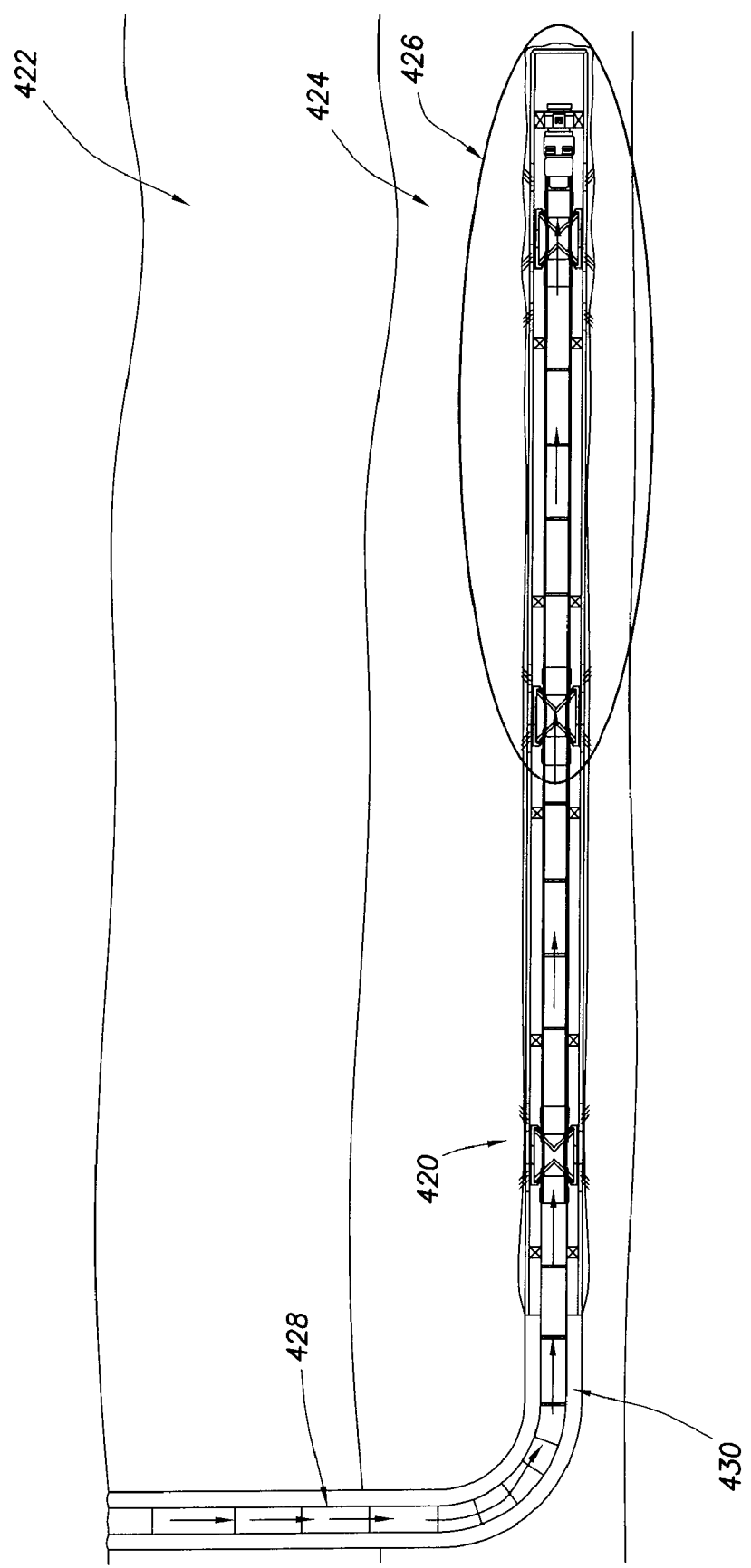

As shown in FIG. 2 above, a typical field has wellsites with vertical or angled wellbores. FIG. 4-1 shows an example of an injection well (i.e., injector) (403) and a producing well (i.e., producer) (413) with horizontal wellbore portions disposed through a reservoir (402) of a subterranean formation (401). As shown in FIG. 4-1, wellsite equipment B (411) and wellsite equipment A (412) are positioned at the surface (410) of land or sea and connected to the injection well (403) and producing well (413), respectively. In one or more embodiments, the injection well (403) may be a steam injection well and a portion of subterranean formation (401) may have a porous composition of porous materials, including but not limited to sand and carbonates.

FIG. 4-2 depicts a steam injection well in accordance with one or more embodiments. Those skilled in the art, having the benefit of this detailed description, will appreciate the components shown in FIG. 4-2 may differ among embodiments, and that one or more of the components may be optional. In one or more embodiments, one or more of the components shown in FIG. 4-2 may be omitted, repeated, supplemented, and/or otherwise modified from that shown in FIG. 4-2. Accordingly, the specific arrangement of components shown in FIG. 4-2 should not be construed as limiting the scope of intelligent completion design for a reservoir.

As described above, SAGD operation is a common recovery method for oil sands. In addition, SAGD operation may also be used in carbonate reservoirs where bitumen can be found in carbonate rocks (e.g., limestone, dolomite, chalk, etc.). SAGD operations may be applicable to carbonate reservoirs by using a new mix of injection solvents for steam injection operation in carbonate reservoirs.

As shown in FIG. 4-2, the steam injection well (420) has a vertical section and a high angle (e.g., horizontal) section penetrating the subterranean formation (422) to access the reservoir (424). The steam injection well (420) includes a pipe (428) and an annulus (430) between the pipe (428) and the wall of the steam injection well (420). An expanded portion (426) of the horizontal section of the steam injection well (420) is shown in detail in FIG. 4-3 and described below.

In typical steam injection operations (e.g., SAGD operations), both injectors and producers are completed with casing. As shown in FIG. 4-3, in addition to casing (442), the steam injection well (440) is also completed with tubing (444) inside the casing (442) to the toe of the well. In one or more embodiments, individual sections for steam injections may be created in the annulus (446) using Inflow Control Devices (ICDs) (448) and packers (450). An ICD (448) may be a device and/or method for directing the flow of a fluid and/or steam from inside the tubing (444), through one or more holes in the tubing (444), into the annulus, (446), through individual injection segments (452) in the casing (442), and into the formation. A packer (450) may be a device that is substantially affixed between the outer wall of the tubing (444) and the inner wall of the casing (442). In one or more embodiments, the packer covers the entire circumference of the tubing (444). A packer (450) may be made of such a material as to substantially prevent fluid and/or steam from flowing through or around the packer (450). The strategic placement of ICDs (448) and packers (450) facilitates intelligent completion design of a reservoir.

Those skilled in the art will appreciate that individual sections of steam absorbers may exist in a producing well (not shown) separately from, or in conjunction with, the individual sections for steam injections, as described above. In this case, individual sections of steam absorbers may be created in the annulus of a producing well using Inflow Control Devices (ICDs) and packers as discussed above with respect to the steam injection well (440).

In one or more embodiments, the entire horizontal section for both injectors (e.g., (440)) and producers (not shown) are perforated at certain identified locations based on a geological profile of the reservoir according to a pre-determined criteria. The pre-determined criteria may be, for example, where a minimum of 5 meters of continuous porous material (e.g., sand, carbonate, or other porous producing formation) are detected above the wellbore. In one or more embodiments, the pre-determined criteria may also include a minimum of 10 meters of cumulative porous material (e.g., sand, carbonate, or other porous producing formation) detected above the wellbore. In other words, the casings are perforated when both of the conditions are met. In one or more embodiments, the amount of continuous porous material and/or cumulative porous material may be determined using modeling tools (e.g., of FIG. 3) based on various measurement data.

Further, as shown in FIG. 4-3, the steam (represented by arrows) flows inside the steam injection well (440) through the tubing (444) and flows out towards the annulus (446) via the ICDs (448). In one or more embodiments, inside the annulus (446), individual injection segments (452) may be created through the casing (442) and into the reservoir (454) by placing packers (450) between the casing (442) and the tubing (444) to constrain the area (on either side) where steam can penetrate the reservoir (454). This placement of the packers (450) ensures that steam flows into good bitumen-bearing material (e.g., sand, carbonate, or other porous producing formation) and that heat is transferred from the steam to the cold bitumen. As a result, the heated crude flows down towards the producers (not shown) and enters into the wellbore from the good reservoir zone as the producers are also connected to the reservoir at the locations identified above, for example where a minimum of 5 meters of continuous porous material (e.g., sand, carbonate, or other porous producing formation) is available. In one or more embodiments, the steam injection configuration and/or the configuration of the steam injection well is defined based on modeling tools, as discussed above with respect to FIG. 3. The steam injection configuration and/or the configuration of the steam injection well may facilitate the formation of the steam chamber and the accelerated flow of crude in the reservoir towards the producer.

Those skilled in the art will appreciate that individual sections of steam absorbers may exist in a producing well separately from, or in conjunction with, the individual sections for steam injections, as discussed above. In one or more embodiments, individual sections of steam absorbers are created in the annulus of a producing well using ICDs and packers, similar to those discussed above with respect to injection wells in FIGS. 4-2 and 4-3.

Figure 5:
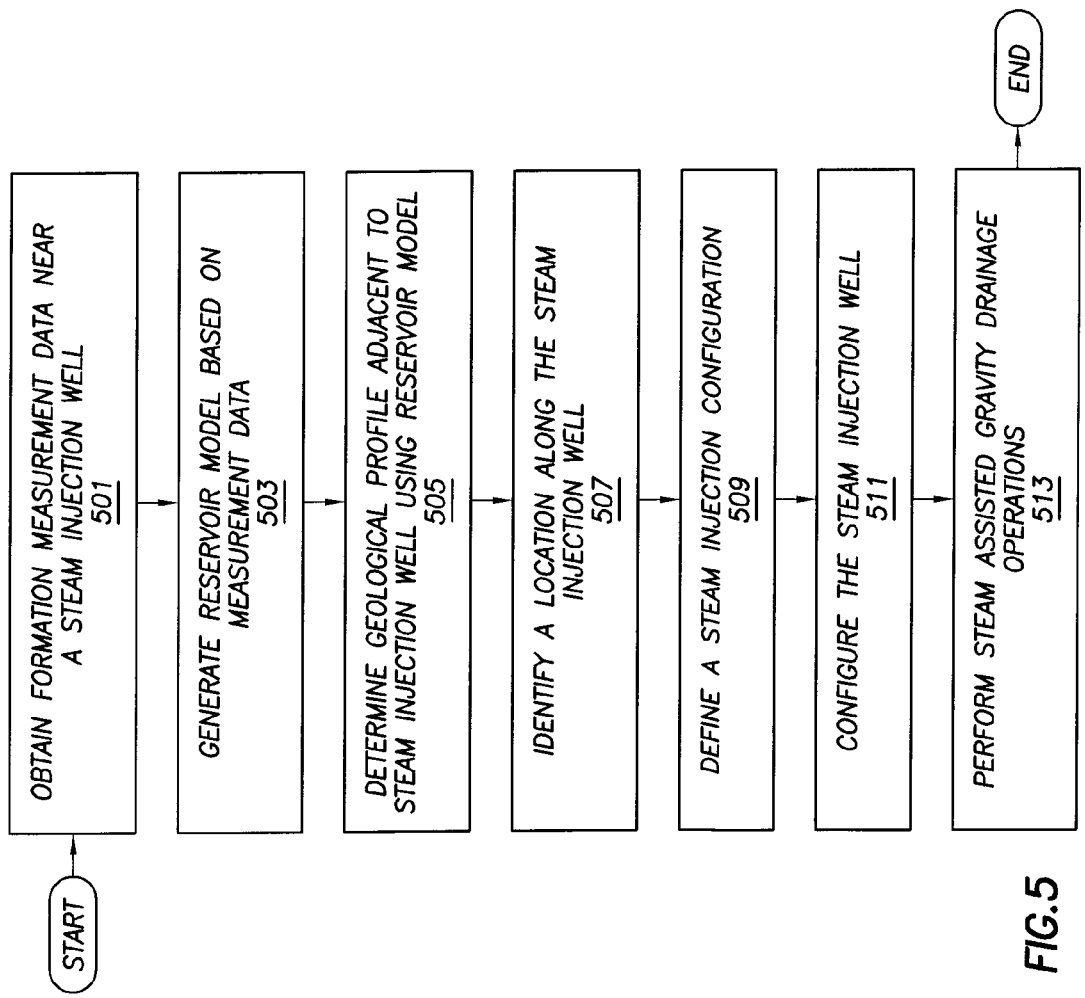
FIG. 5 illustrates an example method for intelligent completion design for a reservoir in accordance with one or more embodiments.

FIG. 5 depicts a flowchart of a method in accordance with one or more embodiments. One or more of the blocks shown in FIG. 5 may be omitted, repeated, and/or performed in a different order. Accordingly, embodiments should not be considered limited to the specific arrangements of blocks shown in FIG. 5.

In one or more embodiments, the method depicted in FIG. 5 may be practiced using the steam injection well (403 and 420) described with respect to FIGS. 4-1 and 4-2 above, respectively. Initially, formation measurement data near a steam injection well may be obtained (block 501). The measurement data may include, but is not limited to, seismic data, resistivity log, γ-ray log, or other well log data. The measurement data may be obtained based on accuracy sought and/or may be limited by budget constraints. In one or more embodiments, the measurement data may be obtained from existing wells located near the steam injection well. In one or more embodiments, the measurement data may be obtained during the drilling of the steam injection well or the producer well. In one or more embodiments, a computer, as described with respect to FIG. 7 below, is used to obtain the formation measurement data near the steam injection well.

In block 503, a reservoir model is generated based on measurement data. In one or more embodiments, the reservoir model is based on the measurement data described above in block 501. In one or more embodiments, a computer, as described with respect to FIG. 7 below, is used to generate the reservoir model based on measurement data. The reservoir model may be a full field numerical model, a geostatistical model, or some other suitable model.

In block 505, a geological profile adjacent to the steam injection well is determined. In one or more embodiments, the reservoir model described in block 503 is used to determine the geological profile adjacent to the steam injection well. The geological profile may provide information associated with the reservoir adjacent to the steam injection well. Specifically, the geological profile may provide information to aid in a number of operational decisions, as described below. In one or more embodiments, the geological profile may be determined above, adjacent to, and/or along at least a section of the steam injection well. The geological profile may be a thickness profile of continuous porous material and/or cumulative porous material. The reservoir may be modeled/simulated based on direct measurement data and/or post-processing data. In one or more embodiments, seismic data and well log data is statistically combined, interpolated, extrapolated, correlated, or otherwise processed for use by the reservoir model. In one or more embodiments of the invention, a computer, as described with respect to FIG. 7 below, is used to determine the geological profile using the reservoir model.

In block 507, a location(s) may be identified along the steam injection well. In one or more embodiments, the location(s) are based on the geological profile and a pre-determined criteria. In one or more embodiments, the pre-determined criteria may include a certain amount (e.g., minimum of 5 meters) of continuous porous material above the wellbore. In one or more embodiments, the pre-determined criteria may also include a certain amount (e.g., minimum of 10 meters) of cumulative porous material detected above the wellbore. In one or more embodiments of the invention, a computer, as described with respect to FIG. 7 below, is used to identify the location(s) along the steam injection well.

In block 509, a steam injection configuration may be defined based on the location(s) identified above. In one or more embodiments, the steam injection configuration may include a configuration of a tubing and a well perforation in the steam injection well as described with respect to FIG. 4-3. In one or more embodiments, the steam injection configuration may also include a well perforation in the producing well corresponding to that of the adjacent steam injection well. In one or more embodiments, the perforations, the ICDs, and the packers are located according to the location(s) identified in block 507. In one or more embodiments of the invention, a computer, as described with respect to FIG. 7 below, is used to define the steam injection configuration.

In block 511, the steam injection well may be configured according to the steam injection configuration. In one or more embodiments, the ICDs and the packers may be configured based on the steam injection configuration to direct the steam flow from inside the tubing to the desired individual injection segments inside the annulus. In one or more embodiments of the invention, a computer, as described with respect to FIG. 7 below, is used to configure the steam injection well.

In block 513, the SAGD operations are performed. The SAGD operations may be performed using the steam injection well as configured above. In one or more embodiments, the steam may be injected into the reservoir where baffles and barriers are not present based on the amount of continuous porous material predicted from the reservoir modeling. In one or more embodiments, the injected steam forms steam chamber in the reservoir where sufficient amount of porous material exist for productive operation based on the amount of cumulative porous material predicted from the reservoir modeling. In one or more embodiments of the invention, a computer, as described with respect to FIG. 7 below, is used to perform SAGD operations.

EXAMPLE

Consider an example in which one or more embodiments of intelligent completion design for a reservoir may be implemented. While the following example is specific to an embodiment of intelligent completion design for a reservoir, this example should not be construed as limiting the scope of intelligent completion design for a reservoir.

Initially, a reservoir is identified in a subterranean formation in which ultra-heavy oil and/or bitumen resources are located. At least one injection well and at least one production well, each reaching into the reservoir, are completed. During completion of each injection well and each production well, data is collected. Examples of data collected may include categorization of one or more materials (e.g., facies) found at various depths, as well as characteristics of each material, such as oil saturation, permeability, and porosity. Examples of facies are mud, sandy mud, muddy sand, fine sand, and sand. Each well may be completed with casing.

A simulation model incorporates the collected data from all of the wells to evaluate one or more SAGD processes. Each simulation of a SAGD process may involve one or more ICD and/or one or more packers. The simulation model may also include a flow model to simulate reservoir characteristics. The model may divide the wellbore into multiple segments, where each segment is evaluated with respect to that segment's influence on the reservoir. The flow model may allow for complex, multiphase flow effects, including, but no limited to, counterflow (e.g., in slowly flowing horizontal wells), fluid fallback, variable wellbore storage, and friction.

Figure 6:
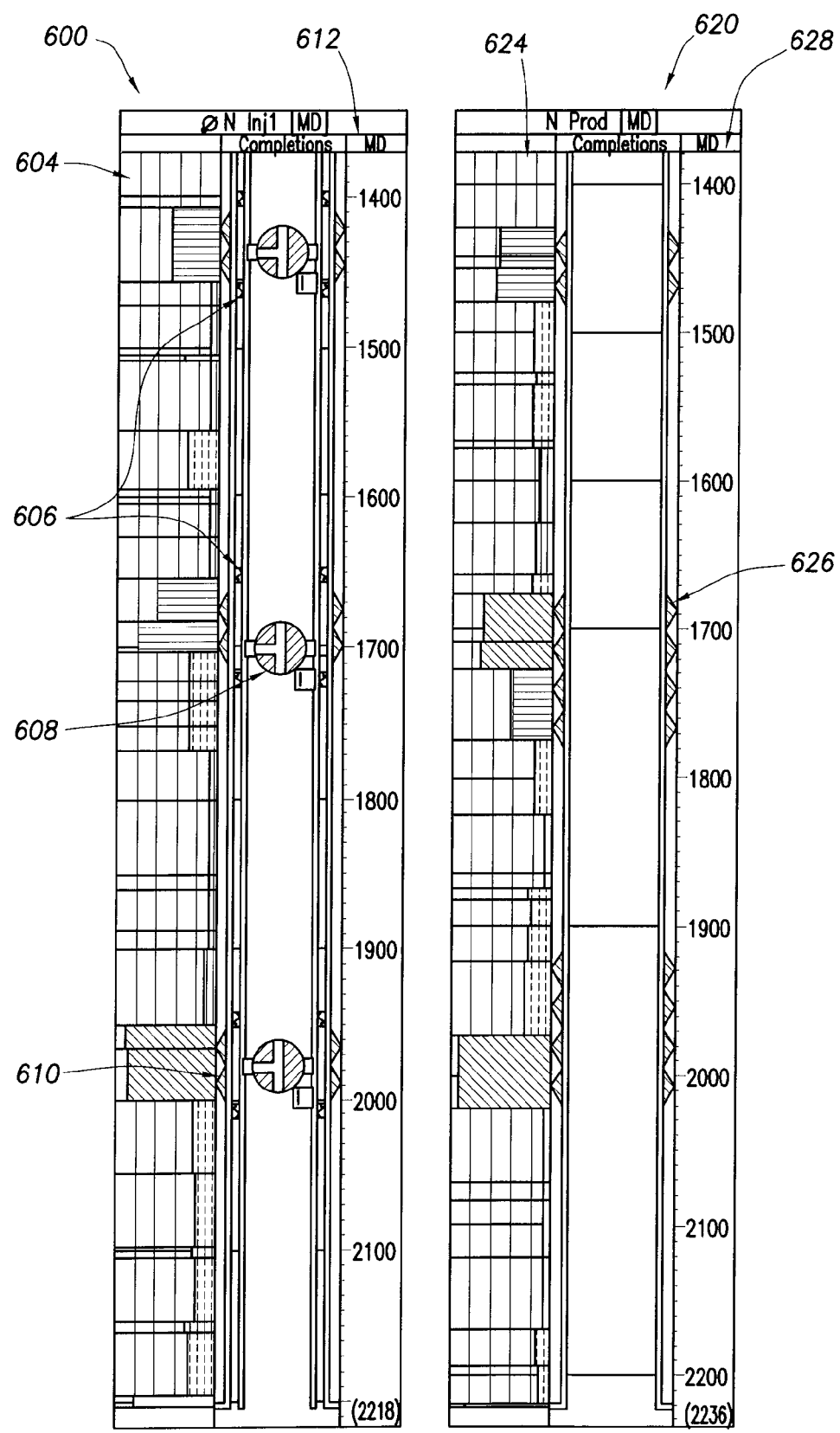
FIG. 6 illustrates example display for intelligent completion design for a reservoir in accordance with one or more embodiments

The output of each simulation from the model may reveal one or more locations within one or more injection wells in which to place ICDs and packers and in which to inject a specified amount of steam. An example of an output of a simulation produced by the model is shown in FIG. 6. FIG. 6 shows graphical depictions of an injection well (600) and a production well (620). The measured depth (612) of the injection well (600) is aligned with the measured depth (628) of the production well (620). The area to the left of the depiction of the injection well (600) is a graphical estimate of the resource availability (604), both in terms of volume (shown by the magnitude of the bar) and material, which can be shown by different colors or shading. The resource availability (604) in the injection well (600) corresponds to the measured depth (612) of the injection well (600).

The center part of the graphical depiction of the injection well (600) shows locations of ICDs (e.g., 608), packers (e.g., 606), and perforations (e.g., 610) in the casing or outer wall of the injection well (600). The locations of the ICDs (e.g., 608), packers (e.g., 606), and perforations (e.g., 610) in the casing or outer wall of the injection well (600) correspond to the measured depth (612) of the injection well (600).

The graphical depiction of the production well (620) also includes, in addition to the measured depth (628), a graphical estimate of the resource availability (624) adjacent to the production well (620). The graphical estimate of the resource availability (624) adjacent to the production well (620) may include the effects of a SAGD operation performed on the injection well (600) in light of the location of the ICDs (e.g., 608), packers (e.g., 606), and perforations (e.g., 610) in the casing or outer wall of the injection well (600). The graphical estimate of the resource availability (624) may be shown both in terms of volume (shown by the magnitude of the bar) and material, which can be shown by different colors or shading. The resource availability (624) in the production well (620) corresponds to the measured depth (628) of the production well (620).

The center part of the graphical depiction of the production well (620) shows locations of perforations (e.g., 626) in the casing or outer wall of the production well (620). The locations of the perforations (e.g., 626) in the casing or outer wall of the production well (620) correspond to the measured depth (628) of the production well (620). When the SAGD operation is performed in the injection well (600), the fluids and other geomaterials adjacent to the production well (620) flow into the production well (620) from the reservoir through the perforations (e.g., 626).

A financial analysis may accompany each simulation produced by the model. The financial analysis may be for the projected production life of a production well, or it may be for a fixed amount of time. The financial analysis may allow for certain assumptions, including but not limited to royalty calculations, sales price of the material extracted from the production well, operating costs, inflation, water treatment costs, water cycling costs, cost of capital and other relevant interest rates, capital expenditures, maintenance costs, and the cost of natural gas or other fuel sources. The output of the financial analysis may be include a variety of information, including but not limited to net present value, gross revenues, net revenues, and internal rate of return. A decision regarding a specific SAGD operation may be made based on comparing one or more of the results of the financial analysis from different simulations using the model.

Once the location(s) and configuration of the ICDs (e.g., 608), packers (e.g., 606), and perforations (e.g., 610) in the casing or outer wall of the injection well (600) are determined, the injection well (600) may be configured with the ICDs (e.g., 608) and packers (e.g., 606) as shown in the model. In addition, perforations (e.g., 610 and 626) in the casing or outer wall of the injection well (600) and of the production well (620), respectively, may be made. Once the ICDs (e.g., 608) and packers (e.g., 606) are in place and the perforations (e.g., 610 and 626) are made in the casing or outer wall, the SAGD operation is performed in the injection well (600), and the production well (620) is operated to extract the geomaterial(s).

Figure 7:
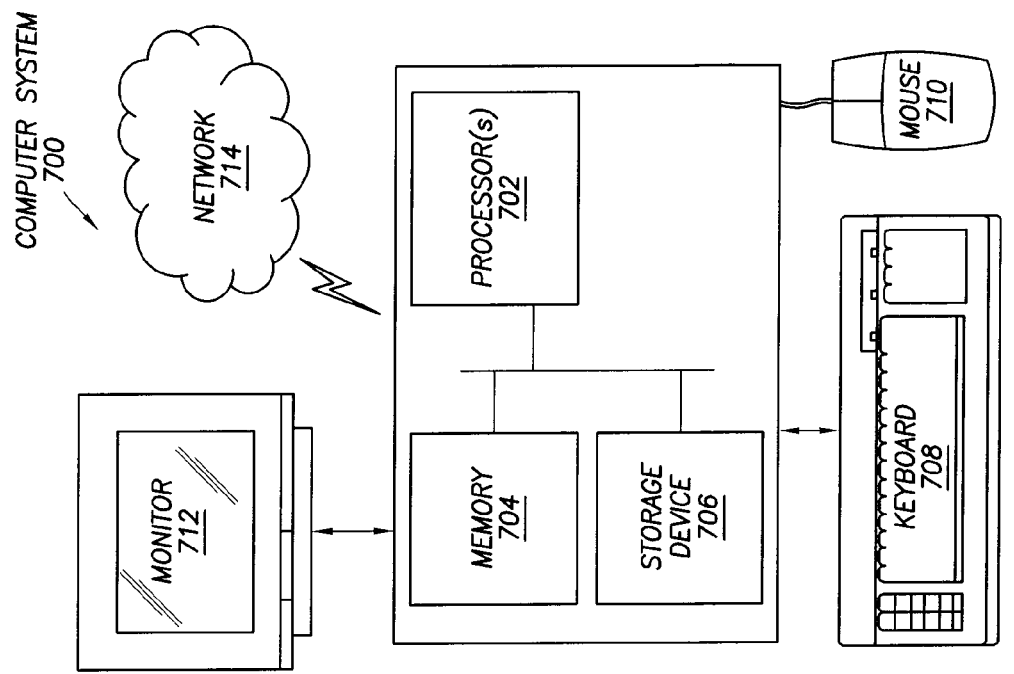
FIG. 7 illustrates a computer system in which one or more embodiments of intelligent completion design for a reservoir may be implemented.

Embodiments of intelligent completion design for a reservoir may be implemented on virtually any type of computer regardless of the platform being used. For instance, as shown in FIG. 7, a computer system 700 includes one or more processor(s) 702, associated memory 704 (e.g., random access memory (RAM), cache memory, flash memory, etc.), a storage device 706 (e.g., a hard disk, an optical drive such as a compact disk drive or digital video disk (DVD) drive, a flash memory stick, etc.), and numerous other elements and functionalities typical of today's computers (not shown). The computer 700 may also include input means, such as a keyboard 708, a mouse 710, or a microphone (not shown). Further, the computer 700 may include output means, such as a monitor 712 (e.g., a liquid crystal display LCD, a plasma display, or cathode ray tube (CRT) monitor). The computer system 700 may be connected to a network 714 (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 700 includes at least the minimal processing, input, and/or output means necessary to practice one or more embodiments.

Further, those skilled in the art will appreciate that one or more elements of the aforementioned computer system 700 may be located at a remote location and connected to the other elements over a network. Further, one or more embodiments may be implemented on a distributed system having a plurality of nodes, where each portion of the implementation (e.g., the modeling tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

It will be understood from the foregoing description that various modifications and changes may be made in embodiments of intelligent completion design for a reservoir without departing from its true spirit. For example, the simulators, reservoir models, and measurement data of the system may be selected to achieve the desired simulation. The simulations may be repeated according to the various configurations, and the results compared and/or analyzed. Furthermore, various designs of the ICDs and packers may be selected to achieve the desired operation. Although specific examples are given with respect to oil sands and carbonate rocks, those skilled in the art, having the benefit of this detailed description, will appreciate that intelligent completion design for a reservoir may be practiced with respect to any porous producing formation and/or extracting any fluid and/or other geomaterials.

While the invention has been described with respect to a limited number of embodiments, those skilled in the art, having benefit of this disclosure, will appreciate that other embodiments may be devised which do not depart from the scope of intelligent completion design for a reservoir as disclosed herein. Accordingly, the scope of intelligent completion design for a reservoir should be limited only by the attached claims.

What is claimed is:

1. A method of performing intelligent completion design for a reservoir within a field having at least one wellsite with a steam injection well penetrating a subterranean formation of the field for extracting fluid from the reservoir therein, comprising:
    obtaining measurement data of the subterranean formation associated with the steam injection well;
    generating, using a processor of a computer, a reservoir model based on the measurement data;
    determining, using the processor, a geological profile adjacent to the steam injection well using the reservoir model;
    identifying, using the processor, a location along the steam injection well where the geological profile indicates that an amount of porous material exceeds a pre-determined threshold;
    defining, using the processor and in response to identifying the location, a steam injection configuration comprising a first perforation of the steam injection well and a second perforation of a producing well adjacent to the steam injection well, wherein the first perforation and the second perforation are at the location based on the amount of porous material exceeding the pre-determined threshold; and
    storing the steam injection configuration.

2. The method of claim 1, wherein the steam injection configuration further comprises a configuration of a tubing in the steam injection well.

3. The method of claim 2, wherein the steam injection configuration further comprises an inflow control device and a plurality of packers.

4. The method of claim 1, further comprising:
    configuring the steam injection well based on the steam injection configuration; and
    performing steam-assisted gravity drainage operations using the steam injection well.

5. The method of claim 4, wherein configuring the steam injection well comprises configuring a tubing and a well perforation in the steam injection well.

6. The method of claim 1, wherein the geological profile comprises a thickness profile of continuous porous material and cumulative porous material along a portion of the steam injection well.

7. The method of claim 1, wherein the reservoir model is a geostatistical model.

8. The method of claim 1, wherein the measurement data comprises seismic data and a well log.

9. The method of claim 1, wherein the measurement data is obtained while drilling the steam injection well.

10. The method of claim 1, further comprising:
    modeling the operations for the field using an economic model based on the steam injection configuration to generate a financial analysis; and
    adjusting the pre-determined threshold based on the financial analysis.

11. A system for performing intelligent completion design for a reservoir within a field having at least one wellsite with a steam injection well penetrating a subterranean formation of the field for extracting fluid from the reservoir therein, comprising:
    a plurality of inflow control devices in the steam injection well for controlling steam flow from inside tubing within the steam injection well to an annulus of the steam injection well;
    a plurality of packers in the annulus of the steam injection well for localizing the steam flow; and
    a modeling tool configured to:
        receive measurement data of the subterranean formation associated with the steam injection well;
        generate, using a processor of a computer, a reservoir model based on the measurement data;
        determine, using the processor, a geological profile adjacent to the steam injection well using the reservoir model;
        identify, using the processor, a location along the steam injection well where the geological profile indicates that an amount of porous material exceeds a pre-determined threshold;
        define, using the processor on the computer and in response to identifying the location, a steam injection configuration comprising a first perforation of the steam injection well and a second perforation of a producing well adjacent to the steam injection well, wherein the first perforation and the second perforation are at the based on the location amount of porous material exceeding the pre-determined threshold; and
        store the steam injection configuration.

12. The system of claim 11, wherein the steam injection configuration further comprises a configuration of the tubing.

13. The system of claim 11, wherein steam-assisted gravity drainage operations are performed using the steam injection well according to the steam injection configuration.

14. The system of claim 11, wherein the geological profile comprises a thickness profile of continuous porous material and cumulative porous material along the portion of the steam injection well.

15. The system of claim 11, wherein the reservoir model is a geostatistical model.

16. The system of claim 11, wherein the measurement data comprises seismic data and a well log.

17. The system of claim 11, wherein the measurement data is obtained while drilling of the steam injection well.

18. The system of claim 11, the modeling tool further configured to:
  model the operations for the field using an economic model based on the steam injection configuration to generate a financial analysis; and
  adjust the steam injection configuration based on the financial analysis.

19. A computer readable medium comprising instructions executable by a processor to perform a method for intelligent completion design for a reservoir within a field, the method comprising:
  obtaining measurement data of a subterranean formation within the field;
  generating a model of the reservoir within the subterranean formation using the measurement data;
  determining a geological profile adjacent to a steam injection well using the model;
  identifying a location along the steam injection well where the geological profile indicates that an amount of porous material exceeds a pre-determined threshold;
  defining, in response to identifying the location, a steam injection configuration comprising a first perforation of the steam injection well and a second perforation of a producing well adjacent to the steam injection well, wherein the first perforation and the second perforation are at the location based on the amount of porous material exceeding the pre-determined threshold; and
  storing the steam injection configuration.

20. The computer readable medium of claim 19, wherein the steam injection configuration further comprises an inflow control device in tubing in the steam injection well and a packer located in the annulus of the steam injection well.

* * * * *